United States Patent
Yin et al.

(10) Patent No.: US 9,521,030 B2
(45) Date of Patent: Dec. 13, 2016

(54) DEPLOYING A TOLL-FREE DATA SERVICE CAMPAIGN BY MODIFYING A UNIFORM RESOURCE IDENTIFIER

(71) Applicant: Verizon Patent and Licensing Inc., Arlington, VA (US)

(72) Inventors: Fenglin Yin, Lexington, MA (US); Susan Kelly, Maynard, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 181 days.

(21) Appl. No.: 14/276,186

(22) Filed: May 13, 2014

(65) Prior Publication Data

US 2015/0334543 A1 Nov. 19, 2015

(51) Int. Cl.
| | |
|---|---|
| *H04M 3/42* | (2006.01) |
| *H04L 12/16* | (2006.01) |
| *H04Q 11/00* | (2006.01) |
| *H04L 29/12* | (2006.01) |
| *H04L 29/08* | (2006.01) |
| *H04W 4/16* | (2009.01) |

(52) U.S. Cl.
CPC ........... *H04L 29/12* (2013.01); *H04L 61/1511* (2013.01); *H04L 61/2007* (2013.01); *H04L 61/308* (2013.01); *H04L 67/02* (2013.01); *H04W 4/16* (2013.01)

(58) Field of Classification Search
CPC ..................... H04M 2215/0192; H04M 15/08; H04M 15/68; G06Q 20/123; G06Q 20/14; H04W 4/00–4/003; H04W 4/02; H04W 4/06–4/206
See application file for complete search history.

(56) References Cited

U.S. PATENT DOCUMENTS

| | | | | |
|---|---|---|---|---|
| 8,239,532 | B1 * | 8/2012 | Roskind | H04L 67/1036 370/235 |
| 2005/0090230 | A1 * | 4/2005 | Liao | H04L 12/14 455/406 |
| 2008/0005295 | A1 * | 1/2008 | Burroughs | G06Q 10/06 709/223 |
| 2008/0201344 | A1 * | 8/2008 | Levergood | G06Q 20/10 |
| 2008/0306814 | A1 * | 12/2008 | Hudson | G06Q 30/02 705/14.73 |
| 2012/0155380 | A1 * | 6/2012 | Hodges | G06Q 30/00 370/328 |
| 2012/0278229 | A1 * | 11/2012 | Vishwanathan | G06Q 20/123 705/40 |

(Continued)

*Primary Examiner* — San Htun

(57) ABSTRACT

A device may receive campaign information for deploying a toll-free data service campaign. The campaign information may identify a uniform resource identifier for accessing a toll-free data service associated with the toll-free data service campaign. The device may determine a host name included in the uniform resource identifier. The device may determine a network address associated with the host name. The device may modify the uniform resource identifier, to generate a modified uniform resource identifier for accessing the toll-free data service, by replacing the host name, included in the uniform resource identifier, with the network address. The device may deploy the toll-free data service campaign by providing, to an enforcement device, the modified uniform resource identifier.

20 Claims, 14 Drawing Sheets

(56) References Cited

U.S. PATENT DOCUMENTS

| | | | | |
|---|---|---|---|---|
| 2013/0318173 A1* | 11/2013 | Kaplinger | ............. | H04L 61/301 709/206 |
| 2014/0018035 A1* | 1/2014 | Albisu | ................ | H04L 12/1403 455/406 |
| 2014/0120867 A1* | 5/2014 | Hodges | .................. | G06Q 30/00 455/406 |
| 2015/0011180 A1* | 1/2015 | Buonomo | ............... | H04W 4/24 455/406 |

* cited by examiner

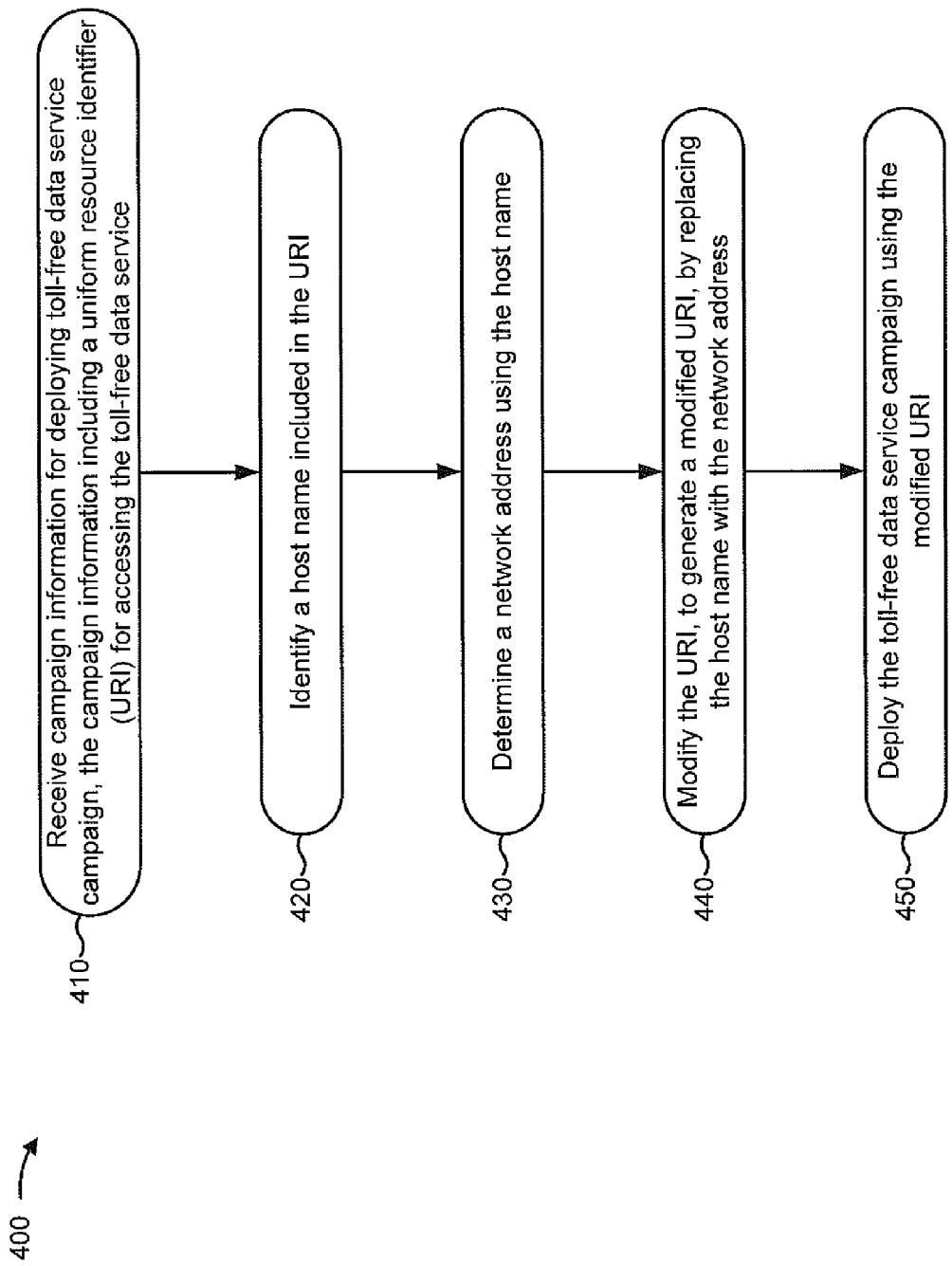

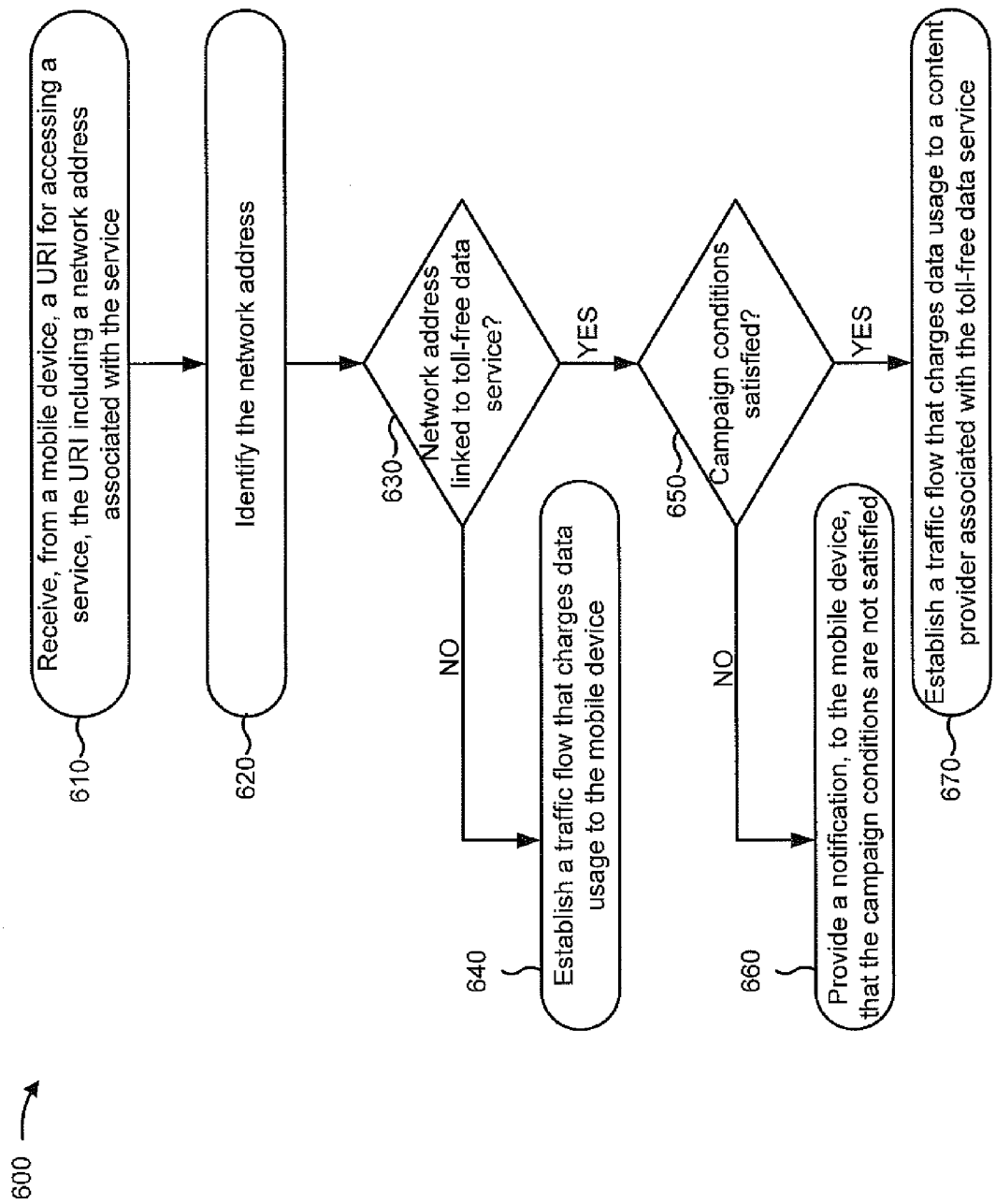

DEPLOYING A TOLL-FREE DATA SERVICE CAMPAIGN BY MODIFYING A UNIFORM RESOURCE IDENTIFIER

BACKGROUND

A toll-free telephone number may refer to a special telephone number that is free for the calling party, with the cost of the call instead being charged by the telephone carrier to the called party. Similarly, a toll-free data service may refer to a service where a network operator charges data usage (e.g., byte usage) to a service provider that provides the toll-free data service, rather than to an end user that uses the toll-free data service.

BRIEF DESCRIPTION OF THE DRAWINGS

FIG. 4 is a flow chart of an example process for deploying a toll-free data service campaign by modifying a uniform resource identifier;

FIG. 6 is a flow chart of an example process for implementing a deployed toll-free data service campaign;

DETAILED DESCRIPTION OF PREFERRED EMBODIMENTS

The following detailed description of example implementations refers to the accompanying drawings. The same reference numbers in different drawings may identify the same or similar elements.

A toll-free data service may refer to a service where a network operator charges data usage (e.g., byte usage) to a service provider (e.g., a content provider) that provides the toll-free data service, rather than to an end user that uses a mobile device to access the toll-free data service. A content provider may set up a toll-free data service campaign that describes parameters of a toll-free data service, such as a uniform resource identifier (URI) (e.g., a uniform resource locator (URL), a uniform resource name (URN), etc.) that may be used to access the toll-free data service. A network operator may use the parameters to deploy the toll-free data service campaign. However, if the URI includes a host name rather than a network address, then implementing a deployed toll-free data service campaign may include costly delays. Implementations described herein assist in converting a host name in a URI to a network address to more efficiently implement a toll-free data service campaign.

Figure 1:
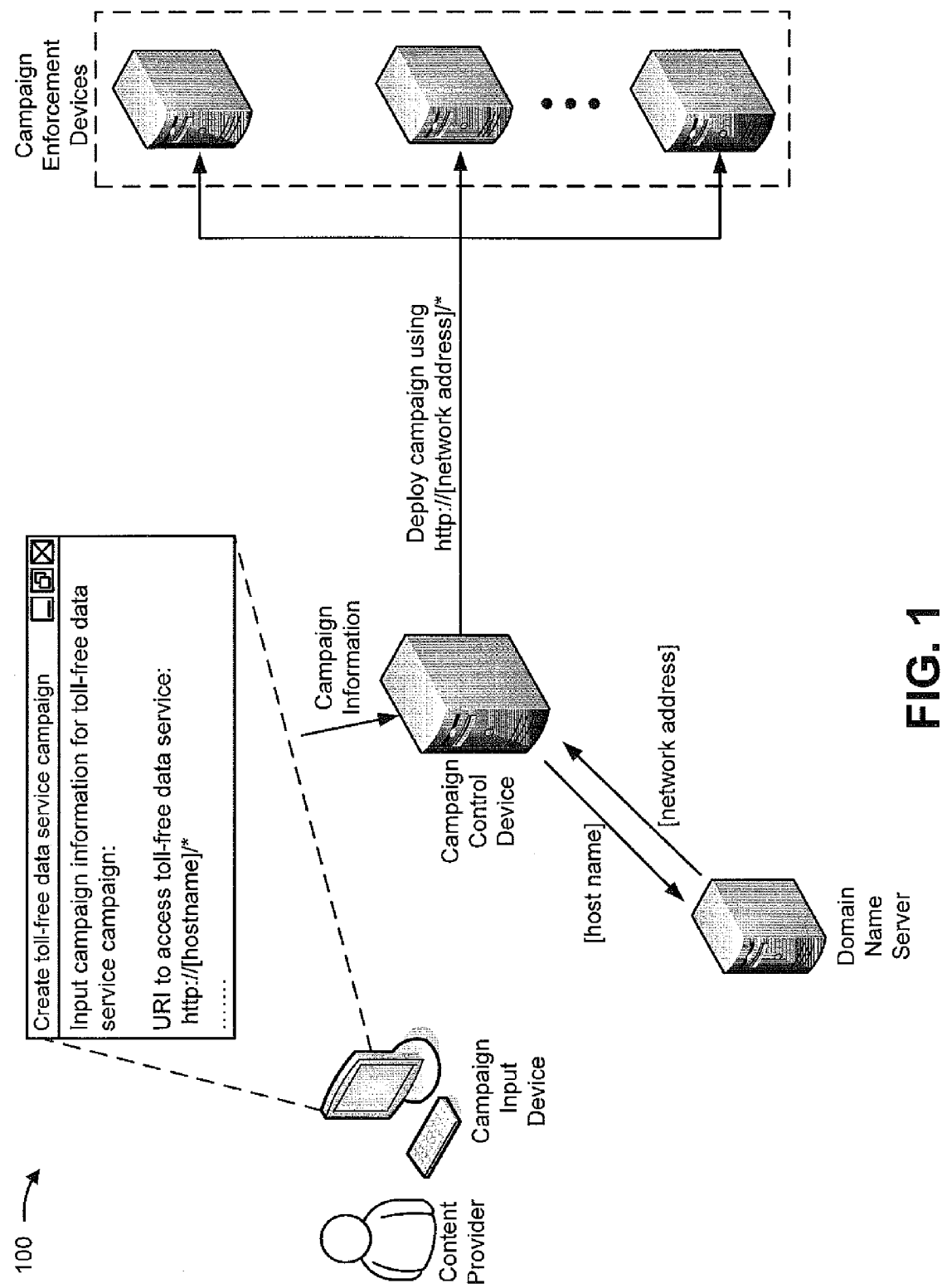
FIG. 1 is a diagram of an overview of an example implementation described herein.

FIG. 1 is a diagram of an overview of an example implementation 100 described herein. As shown in FIG. 1, a content provider may interact with a campaign input device to provide campaign information that describes parameters for deploying a toll-free data service campaign. As shown, the parameters may include a URI for accessing the toll-free data service, and the URI may include a host name.

As further shown in FIG. 1, a campaign control device may receive campaign information for the toll-free data service campaign, and may generate a modified URI by replacing a host name, included in the URI, with a network address. As shown, the campaign control device may obtain the network address by providing the host name to a domain name server, and receiving the network address from the domain name server. The campaign control device may deploy the campaign to multiple campaign enforcement devices, which may be located in different geographic regions, by providing the modified URI, including the network address, to the campaign enforcement devices. In this way, each campaign enforcement device can quickly determine if a transmission control protocol (TCP) flow is necessary for the toll-free data service, thereby increasing the efficiency with which a toll-free data service campaign is implemented.

Figure 2:
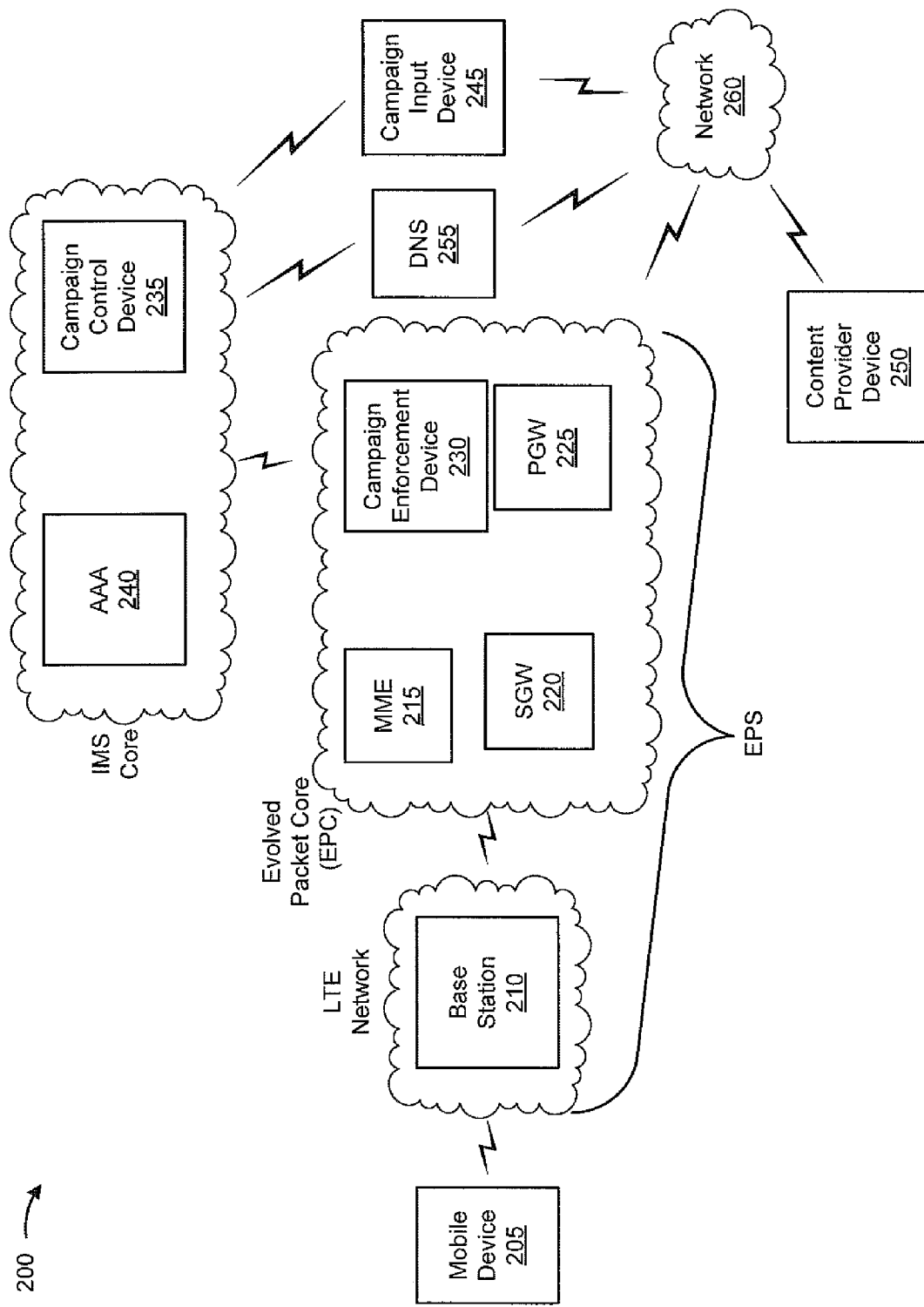
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a mobile device 205; a base station 210; a mobility management entity device (MME) 215; a serving gateway (SGW) 220; a packet data network gateway (PGW) 225; a campaign enforcement device 230; a campaign control device 235; an authentication, authorization, and accounting server (AAA) 240; a campaign input device 245; a content provider device 250; a domain name server (DNS) 255; and a network 260. Devices of environment 200 may interconnect via wired connections, wireless connections, or a combination of wired and wireless connections.

Some implementations are described herein as being performed within a long term evolution (LTE) network for explanatory purposes. Some implementations may be performed within a network that is not an LTE network, such as a third generation (3G) network.

Environment 200 may include an evolved packet system (EPS) that includes an LTE network and/or an evolved packet core (EPC) that operate based on a third generation partnership project (3GPP) wireless communication standard. The LTE network may include a radio access network (RAN) that includes one or more base stations 210 that take the form of evolved Node Bs (eNBs) via which mobile devices 205 communicate with the EPC. The EPC may include MME 215, SGW 220, PGW 225, and campaign enforcement device 230 that enable mobile devices 205 to communicate with network 260 and/or an Internet protocol (IP) multimedia subsystem (IMS) core. The IMS core may include campaign control device 235 and/or AAA 240, and may manage device registration and authentication, session initiation, campaign information, etc., associated with mobile devices 205 and/or content provider devices 250. Campaign control device 235 and/or AAA 240 may reside in the EPC and/or the IMS core.

Mobile device 205 may include one or more devices capable of communicating with base station 210 and/or a network (e.g., network 260). For example, mobile device 205 may include a wireless communication device, a radiotelephone, a personal communications system (PCS) terminal (e.g., that may combine a cellular radiotelephone with data processing and data communications capabilities), a personal digital assistant (PDA), a smart phone, a laptop computer, a tablet computer, a personal gaming system, and/or a similar device. Mobile device 205 may send traffic to and/or receive traffic from network 260 (e.g., via base station 210, SGW 220, and/or PGW 225).

Base station 210 may include one or more devices capable of transferring traffic, such as audio, video, text, and/or other traffic, destined for and/or received from mobile device 205. In some implementations, base station 210 may include an eNB associated with the LTE network that receives traffic from and/or sends traffic to network 260 via SGW 220 and/or PGW 225. Additionally, or alternatively, one or more base stations 210 may be associated with a RAN that is not associated with the LTE network. Base station 210 may send traffic to and/or receive traffic from mobile device 205 via an air interface. In some implementations, base station 210 may include a small cell base station, such as a base station of a microcell, a picocell, and/or a femtocell.

MME 215 may include one or more devices, such as one or more servers, capable of managing authentication, activation, deactivation, and mobility functions associated with mobile device 205. In some implementations, MME 215 may perform operations relating to authentication of mobile device 205. Additionally, or alternatively, MME 215 may facilitate the selection of a particular SGW 220 and/or a particular PGW 225 to serve traffic to and/or from mobile device 205. MME 215 may perform operations associated with handing off mobile device 205 from a first base station 210 to a second base station 210 when mobile device 205 is transitioning from a first cell associated with the first base station 210 to a second cell associated with the second base station 210. Additionally, or alternatively, MME 215 may select another MME (not pictured), to which mobile device 205 should be handed off (e.g., when mobile device 205 moves out of range of MME 215).

SGW 220 may include one or more devices capable of routing packets. For example, SGW 220 may include one or more data processing and/or traffic transfer devices, such as a gateway, a router, a modem, a switch, a firewall, a network interface card (NIC), a hub, a bridge, a server, an optical add/drop multiplexer (OADM), or any other type of device that processes and/or transfers traffic. In some implementations, SGW 220 may aggregate traffic received from one or more base stations 210 associated with the LTE network, and may send the aggregated traffic to network 260 (e.g., via PGW 225) and/or other network devices associated with the EPC and/or the IMS core. SGW 220 may also receive traffic from network 260 and/or other network devices, and may send the received traffic to mobile device 205 via base station 210. Additionally, or alternatively, SGW 220 may perform operations associated with handing off mobile device 205 to and/or from an LTE network.

PGW 225 may include one or more devices capable of providing connectivity for mobile device 205 to external packet data networks (e.g., other than the depicted EPC and/or LTE network). For example, PGW 225 may include one or more data processing and/or traffic transfer devices, such as a gateway, a router, a modem, a switch, a firewall, a NIC, a hub, a bridge, a server, an OADM, or any other type of device that processes and/or transfers traffic. In some implementations, PGW 225 may aggregate traffic received from one or more SGWs 220, and may send the aggregated traffic to network 260. Additionally, or alternatively, PGW 225 may receive traffic from network 260, and may send the traffic to mobile device 205 via SGW 220 and base station 210. PGW 225 may record data usage information (e.g., byte usage), and may provide the data usage information to AAA 240.

Campaign enforcement device 230 may include one or more devices capable of inspecting traffic and applying one or more campaign rules to the traffic. For example, campaign enforcement device 230 may include a gateway, a router, a modem, a switch, a firewall, a NIC, a hub, a bridge, a server, an OADM, or a similar device. Campaign enforcement device 230 may receive campaign rules from campaign control device 235, may apply the campaign rules to traffic received from PGW 225, and may instruct PGW 225 how to handle the traffic based on the campaign rules. Additionally, or alternatively, campaign enforcement device 230 may instruct AAA 240 how to charge for data usage associated with the traffic. Different campaign enforcement devices 230 may be associated with different geographic regions and/or cellular service areas, in some implementations.

Campaign control device 235 may include one or more devices capable of receiving, generating, storing, processing, and/or providing information associated with a toll-free data service campaign (e.g., campaign information, campaign rules, etc.). For example, campaign control device 235 may include a server or a similar device. Campaign control device 235 may receive campaign information from campaign input device 245, may generate campaign rules based on the campaign information, and may deploy the campaign rules to one or more campaign enforcement devices 230 (e.g., associated with one or more cellular service areas).

AAA 240 may include one or more devices, such as one or more servers, that perform authentication, authorization, and/or accounting operations for communication sessions associated with mobile device 205. For example, AAA 240 may store data usage information for mobile device 205, for a user associated with mobile device 205, for content provider device 250, for a content provider (e.g., that provides a toll-free data service), etc.

Campaign input device 245 may include one or more devices capable of receiving, generating, storing, processing, and/or providing information associated with a toll-free data service campaign. For example, campaign input device 245 may include a desktop computer, a laptop computer, a mobile phone, a server, or a similar device. Campaign input device 245 may receive input, from a content provider, that identifies campaign information, and may provide the campaign information to campaign control device 235.

Content provider device 250 may include one or more devices capable of providing content (e.g., to mobile device 205). For example, content provider device 250 may include a server (e.g., a host server, a web server, an application server, etc.) or a similar device. Content provider device 250 may be associated with a content provider that provides a toll-free data service, where the content provider is charged for data usage rather than an end user associated with mobile device 205.

DNS 255 may include one or more devices capable of translating a host name (e.g., a domain name) into a network address (e.g., an internet protocol (IP) address). For example, DNS 255 may include a server or a similar device. DNS 255 may receive information that identifies a host name (e.g., from campaign control device 235), and may provide information that identifies a network address mapped to the host name. DNS 255 may store a data structure that maps host names to network addresses.

Network 260 may include one or more wired and/or wireless networks. For example, network 260 may include a cellular network (e.g., an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
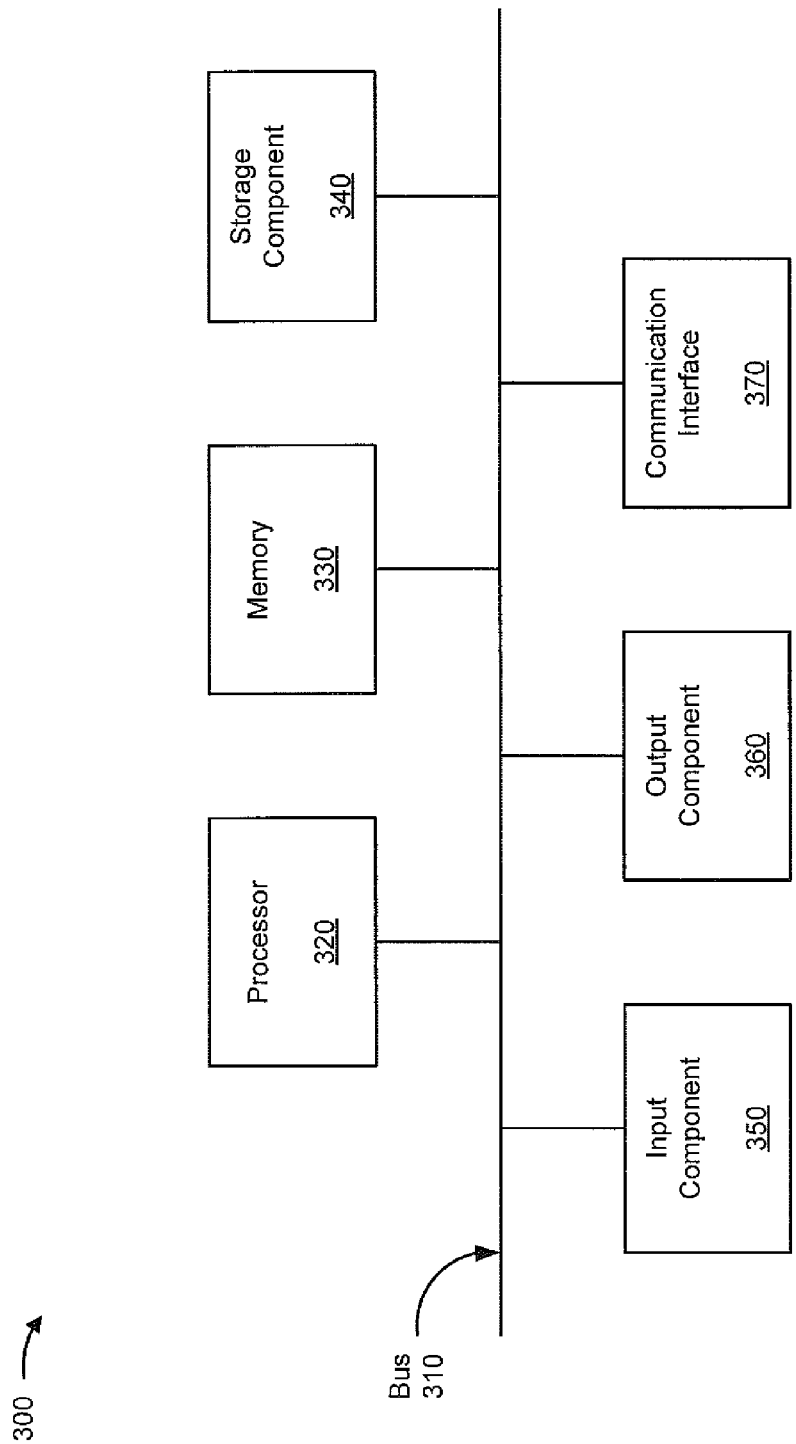
FIG. 3 is a diagram of example components of one or more devices of FIG. 2.

FIG. 3 is a diagram of example components of a device 300. Device 300 may correspond to mobile device 205, base station 210, MME 215, SGW 220, PGW 225, campaign enforcement device 230, campaign control device 235, AAA 240, campaign input device 245, content provider device 250, and/or DNS 255. In some implementations, mobile device 205, base station 210, MME 215, SGW 220, PGW 225, campaign enforcement device 230, campaign control device 235, AAA 240, campaign input device 245, content provider device 250, and/or DNS 255 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for deploying a toll-free data service campaign by modifying a uniform resource identifier. In some implementations, one or more process blocks of FIG. 4 may be performed by campaign control device 235. In some implementations, one or more process blocks of FIG. 4 may be performed by another device or a group of devices separate from or including campaign control device 235, such as mobile device 205, base station 210, MME 215, SGW 220, PGW 225, campaign enforcement device 230, AAA 240, campaign input device 245, content provider device 250, and/or DNS 255.

As shown in FIG. 4, process 400 may include receiving campaign information for deploying a toll-free data service campaign, the campaign information including a uniform resource identifier (URI) for accessing the toll-free data service (block 410). For example, campaign control device 235 may receive campaign information for deploying a toll-free data service campaign. A toll-free data service campaign (sometimes referred to herein as a campaign) may refer to a campaign by a content provider where the content provider agrees to be charged for data usage by users of mobile devices 205 that access content provided by the content provider (e.g., rather than the users being charged for the data usage).

Campaign information may include, for example, information that identifies a content provider associated with a campaign, information that identifies one or more content provider devices 250 that provide content associated with a campaign, information that identifies a geographic region associated with a campaign, information that identifies a time period during which a campaign is valid, information that identifies an amount of data (e.g., in bytes) that the content provider will pay for during the campaign (e.g., a maximum amount of data), information that identifies a uniform resource identifier (URI) via which a toll-free data service can be accessed for a campaign, etc. The URI may include, for example, a uniform resource locator (URL), a uniform resource name (URN), or the like. Additionally, or alternatively, the URI may include, for example, a full URI path (e.g., a full URL path, a full URN path, etc.), a partial URI path (e.g., a URL prefix, a URL suffix, a URN prefix, a URN suffix, etc.), etc. Additionally, or alternatively, the campaign information may include multiple URIs via which the toll-free data service may be accessed. In some implementations, an employee associated with the content provider may input campaign information using campaign input device 245, and campaign input device 245 may provide the campaign information to campaign control device 235.

As further shown in FIG. 4, process 400 may include identifying a host name included in the URI (block 420), and determining a network address using the host name (block 430). For example, campaign control device 235 may identify a host name included in the URI. A host name may refer to a label that is assigned to a device connected to a network (e.g., network 260) to identify the device (e.g., in a particular form of electronic communication, such as the World Wide Web, e-mail, etc.). For example, a host name may include a domain name. A host name may include a top-level domain, a second-level domain, a third-level domain, a full host name, a host name prefix, a host name suffix, etc.

Campaign control device 235 may determine a network address using the host name. For example, campaign control device 235 may provide information identifying the host name to DNS 255. DNS 255 may use the host name to search a data structure to identify a network address associated with the host name. A network address may identify a device associated with the host name. For example, the network address may include an IP address, a media access control (MAC) address, or the like, that identifies content provider device 250 that provides a toll-free data service. Additionally, or alternatively, the network address may identify a port via which the toll-free data service is provided. In some implementations, a single host name may correspond to multiple network addresses that identify multiple respective content provider devices 250 (e.g., associated with geographically distributed web services). DNS 255 may provide information identifying the network address to campaign control device 255. In some implementations, campaign control device 235 may identify multiple host names associated with multiple URIs, and may determine one or more respective network addresses for each host name.

As further shown in FIG. 4, process 400 may include modifying the URI, to generate a modified URI, by replacing the host name with the network address (block 440), and deploying the toll-free data service using the modified URI (block 450). For example, campaign control device 235 may modify the URI, to generate a modified URI, by replacing the host name in the URI with the network address received from DNS 255. In some implementations, campaign control device 235 may replace a service identifier (e.g., a host name), included in the URI, with a device identifier (e.g., a network address). Campaign control device 235 may deploy the toll-free data service campaign using the modified URI.

Campaign control device 235 may deploy the new campaign by providing campaign rules, that instruct campaign enforcement device 230 how to handle network traffic, to campaign enforcement device(s) 230 associated with the campaign. For example, the campaign information may identify a geographic region in which the campaign is to be deployed. Campaign control device 235 may identify campaign enforcement devices 230 located in the geographic region, and may provide campaign rules to the identified campaign enforcement devices 230.

Additionally, or alternatively, the campaign information may identify one or more URIs associated with a toll-free data service. Campaign control device 235 may modify the URI(s), by replacing a host name in each URI with one or more network addresses that correspond to the host name, and may provide the modified URI(s) to campaign enforcement devices 230 so that campaign enforcement devices 230 may identify traffic to be treated as toll-free (e.g., traffic to be charged to the content provider).

Additionally, or alternatively, the campaign information may identify a time period during which the toll-free data service is valid, and campaign control device 235 may provide information that identifies the time period to campaign enforcement devices 230 so that campaign enforcement devices 230 may determine a time period during which to treat traffic as toll-free. Additionally, or alternatively, the campaign information may identify a quantity of data (e.g., in bytes) to be allocated to a toll-free data service, and campaign control device 235 may allocate some of the data to each of the identified campaign enforcement devices 230 so that campaign enforcement devices 230 may determine whether there is available data to be allocated to treat traffic as toll-free.

Campaign control device 235 may generate campaign rules based on the campaign information, in some implementations. A campaign rule may specify one or more campaign conditions for charging a content provider for data used by a mobile device to access a toll-free data service, as described in more detail elsewhere herein. Campaign control device 235 may combine the generated campaign rules into a configuration file, and may provide the configuration file to one or more campaign enforcement devices 230 when deploying the campaign.

Additionally, or alternatively, campaign control device 235 may provide a notification when campaign deployment has been completed. For example, campaign control device 235 may provide a notification to a content provider (e.g., via an email address, via campaign input device 245, via content provider device 250, etc.). By implementing process 400, campaign control device 235 may increase a speed at which toll-free data service campaigns may be implemented (e.g., by reducing or eliminating DNS look-ups performed by individual campaign enforcement devices 230; by more quickly determining, by an individual campaign enforcement device 230, if a TCP flow is needed; etc.).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
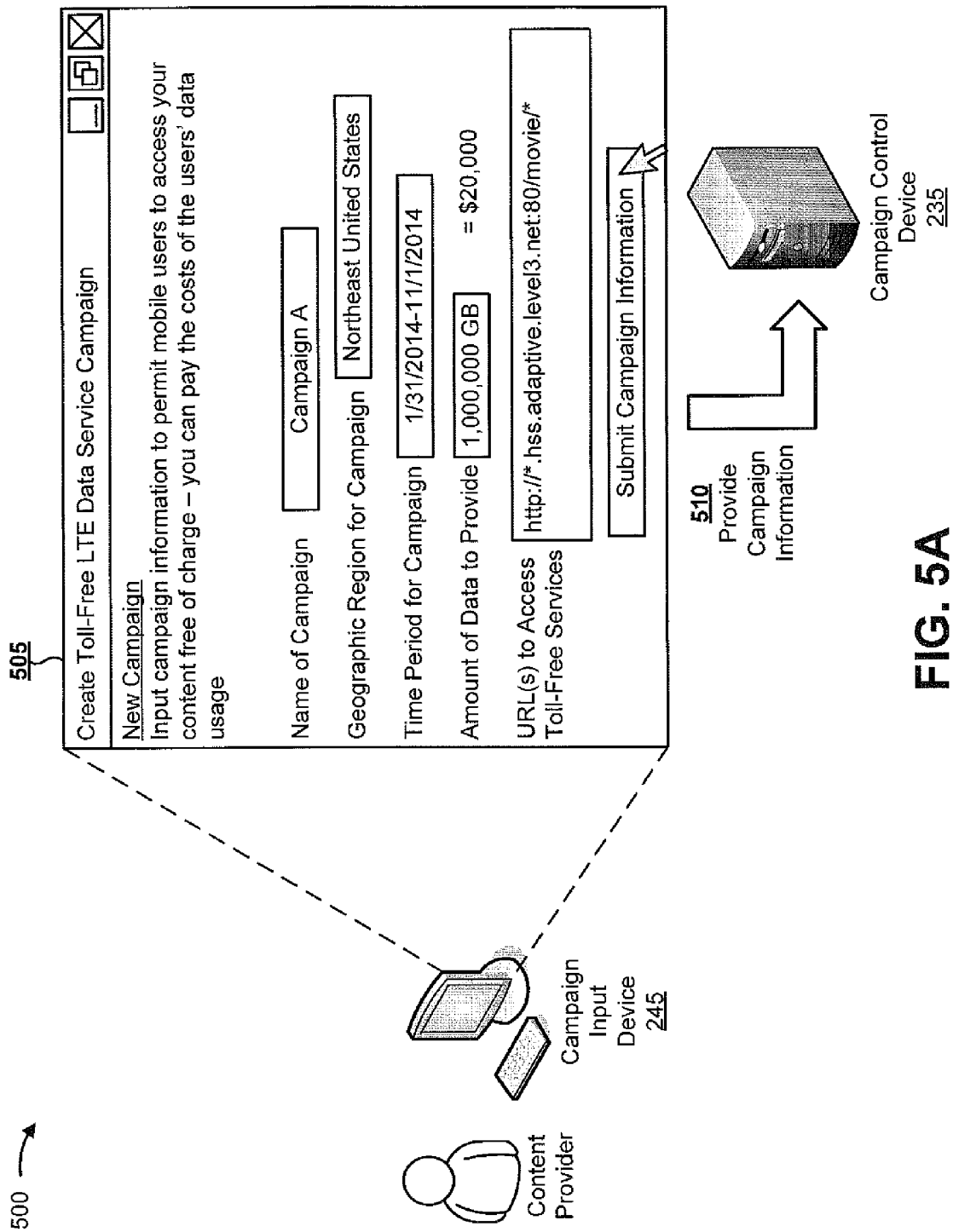
FIGS. 5A-5C are diagrams of an example implementation relating to the example process shown in FIG. 4.
Figure 5B:
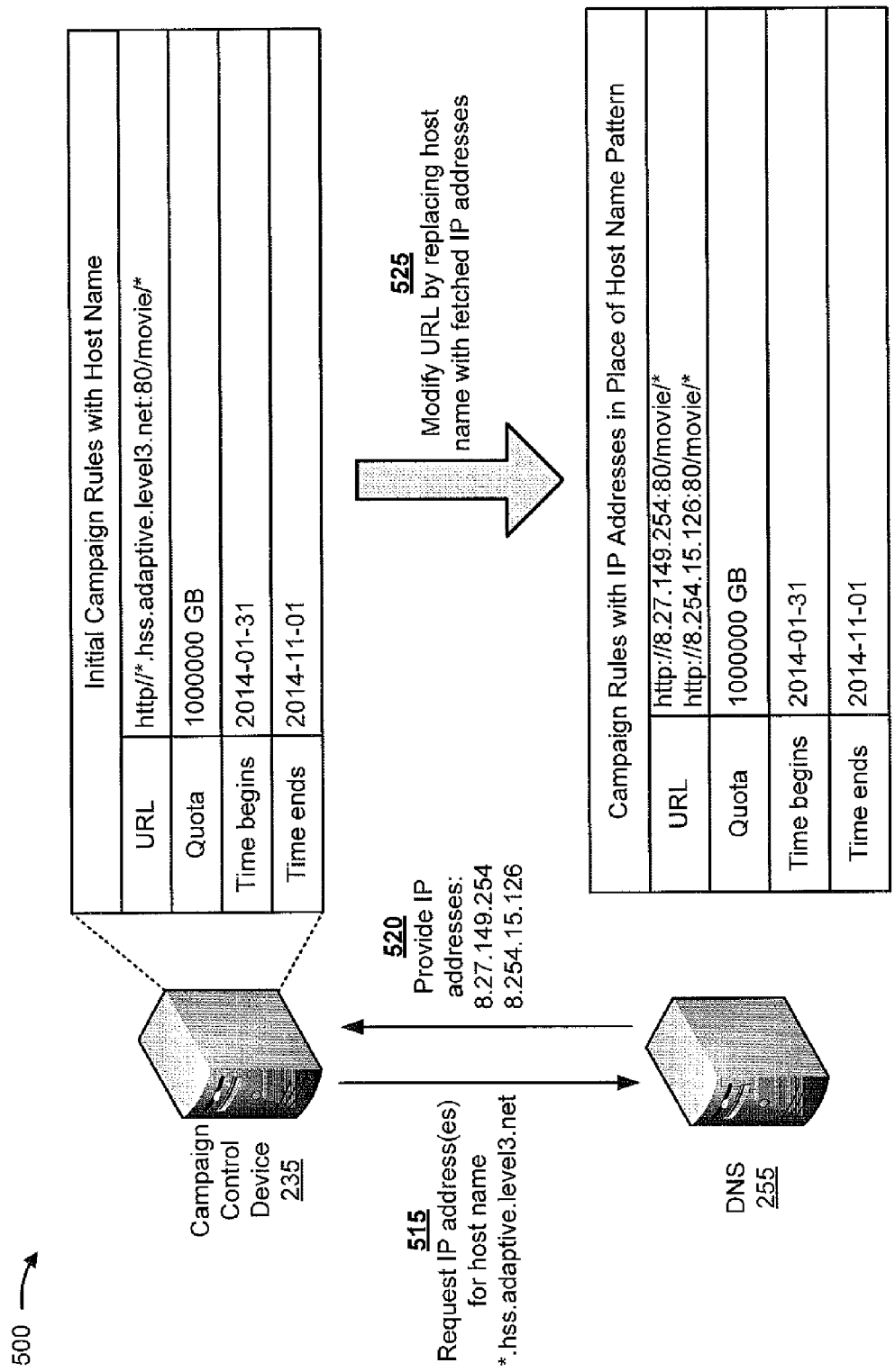
Figure 5C:
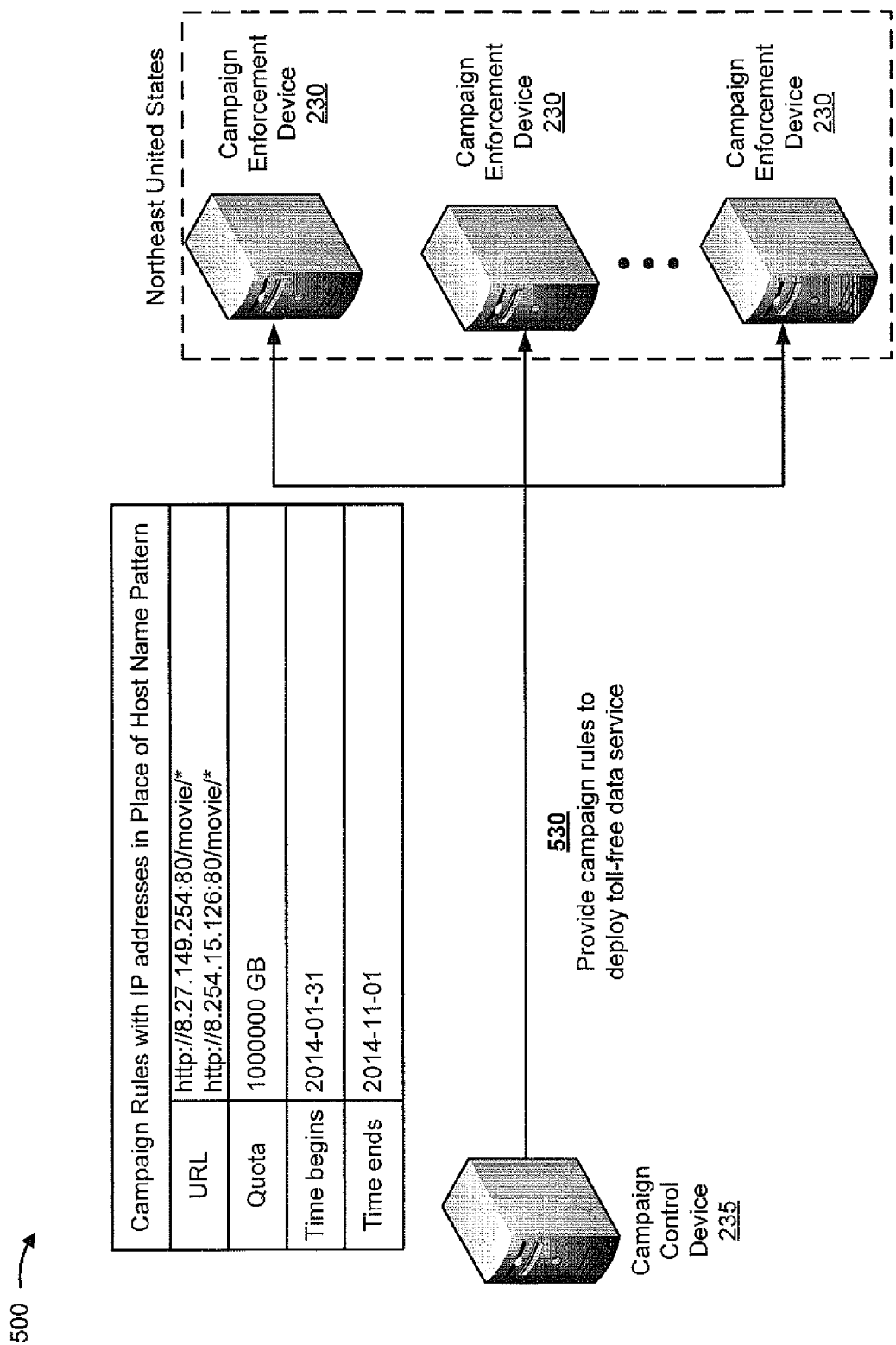

FIGS. 5A-5C are diagrams of an example implementation 500 relating to example process 400 shown in FIG. 4. FIGS. 5A-5C show an example of deploying a toll-free data service campaign by modifying a uniform resource identifier.

As shown in FIG. 5A, and by reference number 505, assume that a content provider interacts with campaign input device 245 to input campaign information to create a toll-free LTE data service campaign. As shown, assume that the content provider inputs a name of the campaign (e.g., a campaign identifier), shown as "Campaign A," a geographic region for the campaign, shown as "Northeast United States," a time period for the campaign, shown as "1/31/2014-11/1/2014," an amount of data (e.g., a maximum amount) to be provided with the campaign, shown as "1,000,000 gigabytes (GB)," which corresponds to a payment of $20,000 by the content provider, and a URL to access the toll-free data service, shown as "http://*.hss.adaptive.level3.net:80/movie/*." Assume that the asterisk (*) represents a wildcard character, and stands for a string of zero or more characters.

As further shown, assume that the content provider interacts with an input mechanism, shown as a "Submit Campaign Information" button, to cause campaign input device 245 to provide the campaign information to campaign control device 235, as shown by reference number 510.

As shown in FIG. 5B, and by reference number 515, assume that campaign control device 235 requests IP addresses, for the host name "*.hss.adaptive.level3.net," from DNS 255. As shown by reference number 520, assume that DNS 255 searches a data structure, using the host name, to identify two IP addresses associated with the host name, shown as "8.27.149.254" and "8.254.15.126." Assume that DNS 255 provides these two IP addresses to campaign control device 235. As shown by reference number 525, assume that campaign control device 235 uses the IP addresses to generate two modified URLs, by replacing the host name with the IP addresses. As shown, assume that the two modified URLs are "http://8.27.149.254:80/movie/*" and "http://8.254.15.126:80/movie/*," where 80 represents a port number.

As shown in FIG. 5C, and by reference number 530, assume that campaign control device 235 deploys Campaign A by providing campaign rules for Campaign A (e.g., generated based on the campaign information received from campaign input device 245) to each campaign enforcement device 230 located in the Northeast United States. Assume that the campaign rules identify the modified URLs generated by service control device 235. Service enforcement devices 230 may use the modified URLs to identify toll-free data service traffic, as described in more detail elsewhere herein As indicated above, FIGS. 5A-5C are provided merely as an example. Other examples are possible and may differ from what was described with regard to FIGS. 5A-5C.

FIG. 6 is a flow chart of an example process 600 for implementing a deployed toll-free data service campaign. In some implementations, one or more process blocks of FIG. 6 may be performed by campaign enforcement device 230. In some implementations, one or more process blocks of FIG. 6 may be performed by another device or a group of devices separate from or including campaign enforcement device 230, such as mobile device 205, base station 210, MME 215, SGW 220, PGW 225, campaign control device 235, AAA 240, campaign input device 245, content provider device 250, and/or DNS 255.

As shown in FIG. 6, process 600 may include receiving, from a mobile device, a URI for accessing a service, the URI including a network address associated with the service (block 610), and identifying the network address (block 620). For example, campaign enforcement device 230 may receive, from mobile device 205 (e.g., via PGW 225), a request to access a service. The request may include, for example, a Hypertext Transfer Protocol (HTTP) request, a File Transfer Protocol (FTP) request, an access request, etc. The request may identify a service using a URI via which the service is provided. The URI may include a network address that identifies a device that provides the service. Campaign enforcement device 230 may analyze the URI to identify the network address (e.g., an IP address).

As further shown in FIG. 6, process 600 may include determining whether the network address is linked to a toll-free data service (block 630). For example, campaign enforcement device 230 may analyze the network address to determine whether the network address is linked to a toll-free data service. In some implementations, campaign enforcement device 230 may compare the network address to a stored network address marked as being associated with a toll-free data service. If the received network address (e.g., included in the URI received from mobile device 205) matches a stored network address, then campaign enforcement device 230 may determine that the service is a toll-free data service. If the received network address does not match a stored network address, then campaign enforcement device 230 may determine that the service is not a toll-free data service.

As further shown in FIG. 6, if the network address is not linked to a toll-free data service (block 630—NO), then process 600 may include establishing a traffic flow that charges data usage to the mobile device (block 640). For example, if campaign enforcement device 230 determines that the requested service is not a toll-free data service (e.g., that the network address is not linked to a toll-free data service), then campaign enforcement device 230 may establish a traffic flow that charges data usage to the mobile device. In some implementations, campaign enforcement device 230 may mark the traffic flow and/or packets associated with the traffic flow as not being associated with a toll-free data service.

As an example, campaign enforcement device 230 may provide an instruction to PGW 225 to establish a traffic flow that charges mobile device 205 (e.g., and/or a user associated with mobile device 205) for data usage associated with the requested service. PGW 225 may route traffic (e.g., packets) associated with the requested service. Additionally, or alternatively, PGW 225 and/or campaign enforcement device 230 may count a quantity of data (e.g., in bytes) used in association with the requested service, and may provide data usage information (e.g., that identifies a quantity of data used) to AAA 240. Additionally, or alternatively, service enforcement device 230 and/or PGW 225 may provide an instruction, to AAA 240, that causes the data usage information to be charged to mobile device 205.

As further shown in FIG. 6, if the network address is linked to a toll-free data service (block 630—YES), then process 600 may include determining whether campaign conditions are satisfied (block 650). For example, if campaign enforcement device 230 determines that the requested service is a toll-free data service (e.g., that the network address is linked to a toll-free data service), then campaign enforcement device 230 may determine whether one or more campaign conditions are satisfied. A campaign condition may be identified in a campaign rule received from campaign control device 235 during deployment of a toll-free data service campaign.

As an example, a campaign condition may specify a time period during which a campaign is valid. If the service request is received during the time period, then the campaign condition may be satisfied. If the service request is not received during the time period, then the campaign condition may not be satisfied. As another example, a campaign condition may specify a geographic region in which the campaign is valid. If the service request is received in the geographic region, then the campaign condition may be satisfied. If the service request is not received in the geographic region, then the campaign condition may not be satisfied.

As another example, a campaign condition may specify a quantity of bytes reserved for a campaign. Service enforcement device 230 and/or PGW 225 may determine whether there are any bytes, out of the original reserved amount of bytes, available to be allocated to the service request. For example, service enforcement device 230 may periodically request and/or may periodically receive, from service control device 235, information that identifies a quantity of available bytes. Service control device 235 may receive information regarding used bytes from one or more service enforcement devices 230, and may update the quantity of available bytes based on the received information. If there are available bytes to be allocated to the service request, then the campaign condition may be satisfied. If there are no available bytes (or not enough available bytes) to be allocated to the service request, then the campaign condition may not be satisfied.

As another example, a campaign condition may be satisfied when a campaign is not marked as paused, and may not be satisfied when the campaign is marked is paused. In some implementations, service control device 235 and/or service enforcement device 230 may mark a campaign as paused based on information received from campaign input device 245. For example, a content provider may wish to pause a campaign, and may provide an instruction to pause the campaign using campaign input device 245. In some implementations, campaign enforcement device 235 may determine whether multiple campaign conditions, described herein, are satisfied.

As further shown in FIG. 6, if the campaign conditions are not satisfied (block 650—NO), then process 600 may include providing a notification, to the mobile device, that the campaign conditions are not satisfied (block 660). For example, if campaign enforcement device 230 determines that the campaign conditions are not satisfied, then campaign enforcement device 230 may notify mobile device 205 that the campaign conditions are not satisfied. The notification may indicate a reason that the campaign conditions were not satisfied, in some implementations (e.g., not enough available bytes, a request during an invalid time period, the campaign has been paused by the content provider, etc.). Mobile device 205 may provide the notification for display so that a user may understand why the toll-free data service is not being provided.

In some implementations, the notification may provide an option for the user to access the requested service at the user's expense (e.g., indicating that the user will be charged for data usage associated with the requested service). If the user agrees to accept data charges, then campaign enforcement device 230 may establish a traffic flow that charges data usage to the mobile device, as described above in connection with block 640. Additionally, or alternatively, service enforcement device may prevent a traffic flow, that charges a content provider associated with the toll-free data service, from being established.

As further shown in FIG. 6, if the campaign conditions are satisfied (block 650—YES), then process 600 may include establishing a traffic flow that charges data usage to a content provider associated with the toll-free data service (block 670). For example, if campaign enforcement device 230 determines that the campaign conditions are satisfied, then campaign enforcement device 230 may establish a traffic flow that charges data usage to a content provider associated with the toll-free data service (e.g., a content provider identified in campaign information for deploying the toll-free data service, a content provider that input the campaign information, etc.). In some implementations, campaign enforcement device 230 may mark the traffic flow and/or packets associated with the traffic flow as being associated with a toll-free data service.

As an example, campaign enforcement device 230 may provide an instruction to PGW 225 to establish a traffic flow that charges the content provider for data usage associated with the requested service. PGW 225 may route traffic (e.g., packets) associated with the requested service. Additionally, or alternatively, PGW 225 and/or campaign enforcement device 230 may count a quantity of data (e.g., in bytes) used in association with the requested service, and may provide data usage information (e.g., that identifies a quantity of data used) to AAA 240. Additionally, or alternatively, service enforcement device 230 and/or PGW 225 may provide an instruction, to AAA 240, that causes the data usage information to be charged to the content provider.

By using network addresses rather than host names to identify toll-free data services, each campaign enforcement device 230 may reduce the amount of time required to detect traffic associated with a toll-free data service. For example, when host names are used, campaign enforcement device 230 may be required to establish a transport control protocol (TCP) session for each traffic flow with mobile device 205, and then tear down the traffic flow if the traffic flow is not associated with a toll-free data service. This may consume additional resources and may take more time than using network addresses to identify toll-free data services.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
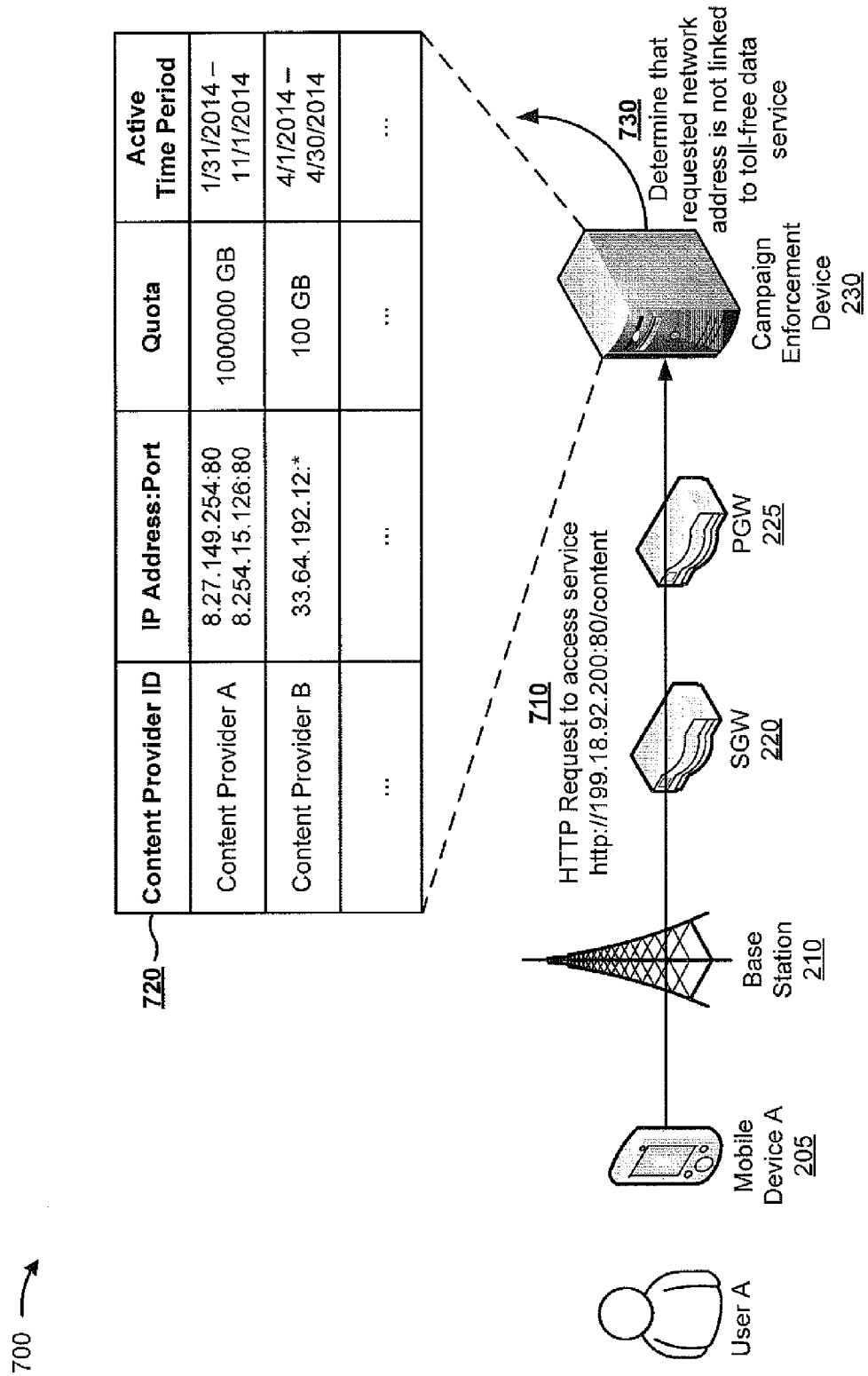
FIGS. 7A and 7B are diagrams of an example implementation relating to the example process shown in FIG. 6.
Figure 7B:
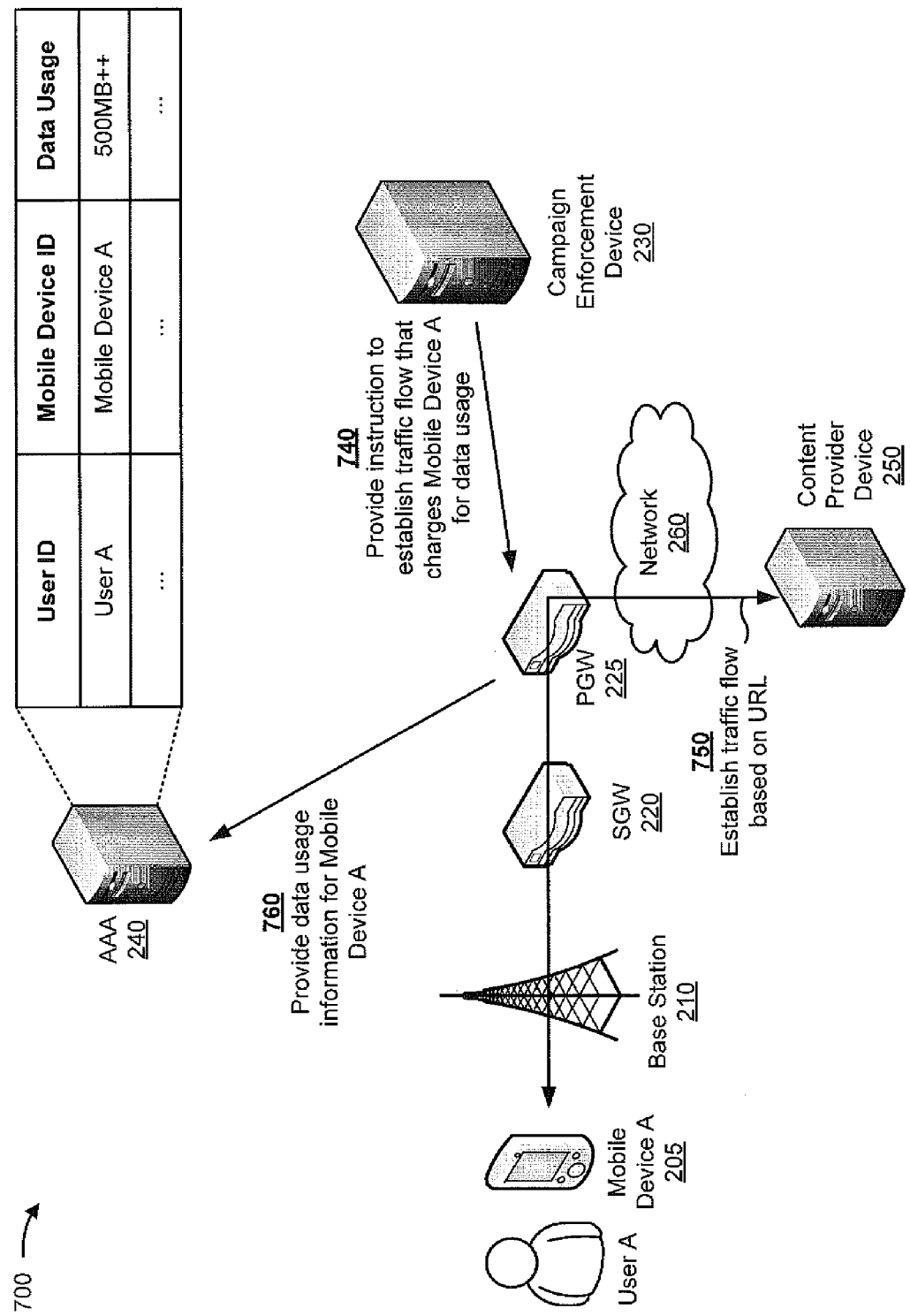

FIGS. 7A and 7B are diagrams of an example implementation 700 relating to example process 600 shown in FIG. 6. FIGS. 7A and 7B show an example of implementing a deployed toll-free data service campaign. For the purpose of FIGS. 7A and 7B, assume that the operations described herein with respect to FIGS. 5A-5C have been performed.

As shown in FIG. 7A, and by reference number 710, assume that a user, shown as User A, interacts with mobile device 205, shown as Mobile Device A, to request a service. As further shown, assume that the request is an HTTP request, and includes a URL with a network address of "199.18.92.200" and a port number of "80." As further shown, assume that service enforcement device 230 receives the request and the URL with the network address. As shown by reference number 720, assume that service enforcement device 230 compares the received network address to a list of stored network addresses, and determines that the received network address does not match a stored network address. Thus, as shown by reference number 730, assume that service enforcement device 230 determines that the requested network address is not linked to a toll-free data service.

As shown in FIG. 7B, and by reference number 740, based on determining that the requested network address is not linked to a toll-free data service, assume that service enforcement device 230 provides an instruction, to PGW 225, to establish a traffic flow that charges Mobile Device A for data usage. As shown by reference number 750, assume that PGW 225 assists in establishing the traffic flow between mobile device 205 (e.g., Mobile Device A) and content provider device 250 (e.g., identified in the request). As shown by reference number 760, assume that PGW 225 provides data usage information, for Mobile Device A, to AAA 240. Based on the received data usage information, assume that AAA 240 updates accounting information for Mobile Device A, which indicates a quantity of bytes used by Mobile Device A in association with the established traffic flow. In this way, AAA 240 may charge mobile device 205 for data usage when mobile device 205 requests a service that is not a toll-free data service.

As indicated above, FIGS. 7A and 7B are provided merely as an example. Other examples are possible and may differ from what was described with regard to FIGS. 7A and 7B.

Figure 8A:
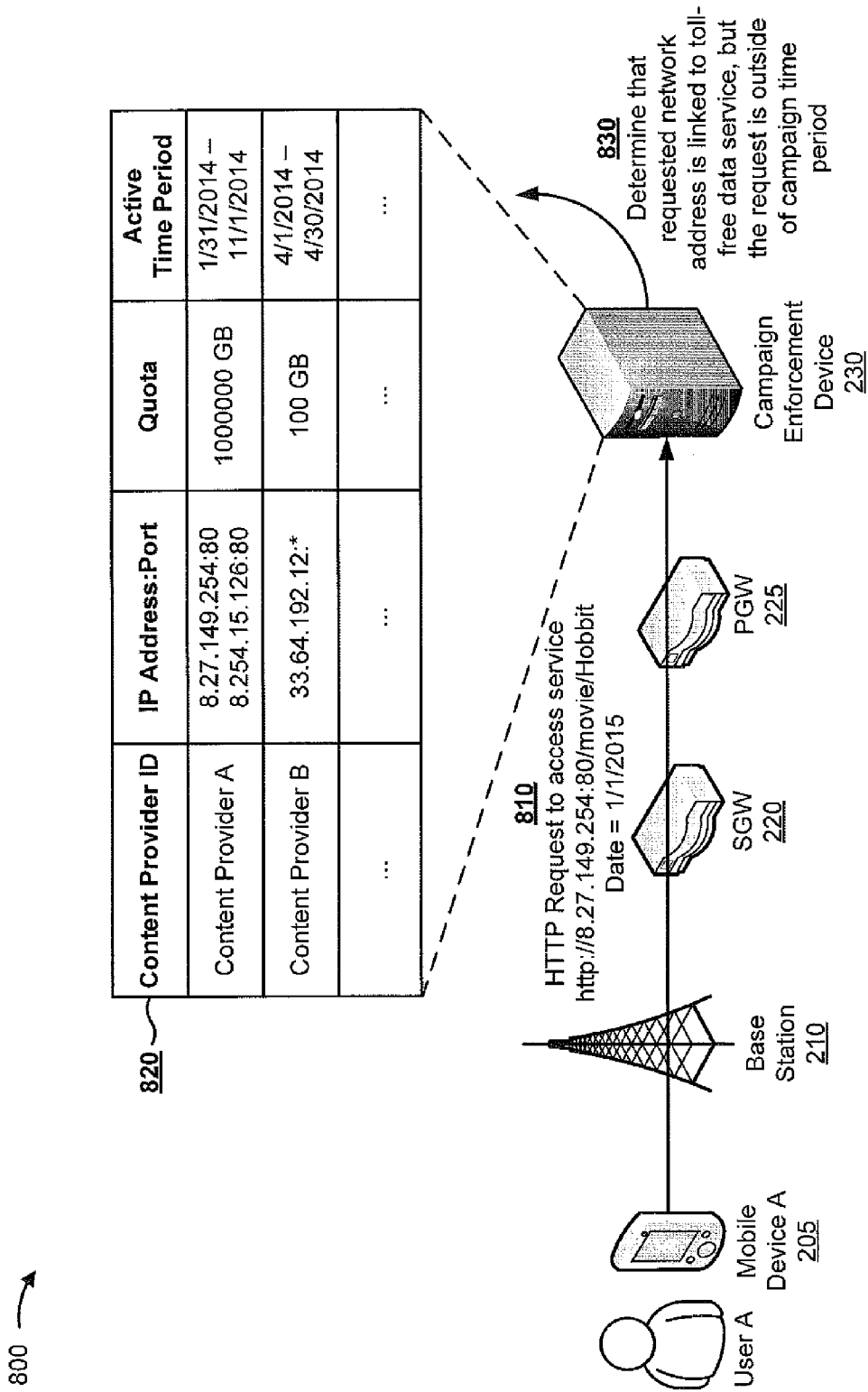
FIGS. 8A and 8B are diagrams of another example implementation relating to the example process shown in FIG. 6.
Figure 8B:
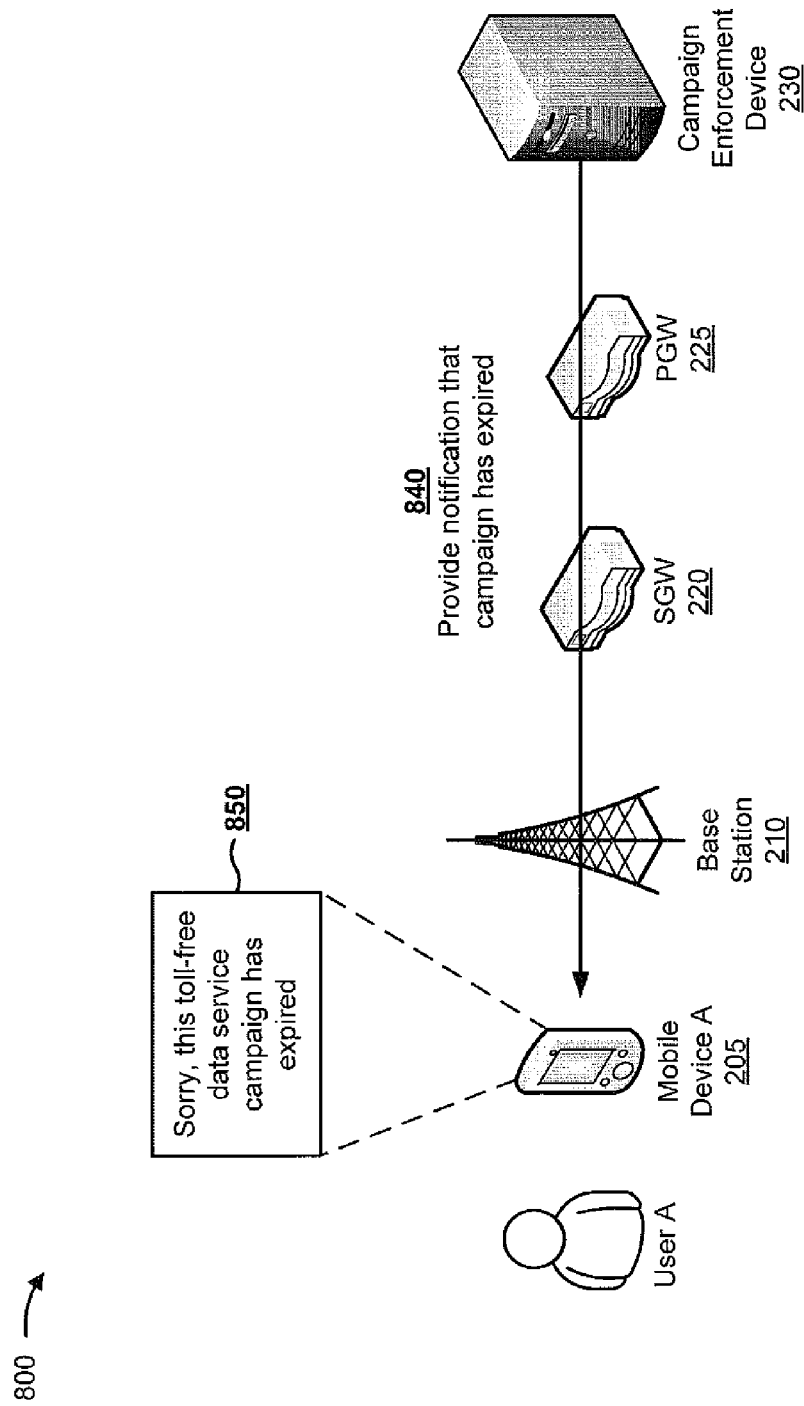

FIGS. 8A and 8B are diagrams of another example implementation 800 relating to example process 600 shown in FIG. 6. FIGS. 8A and 8B show another example of implementing a deployed toll-free data service campaign. For the purpose of FIGS. 8A and 8B, assume that the operations described herein with respect to FIGS. 5A-5C have been performed.

As shown in FIG. 8A, and by reference number 810, assume that a user, shown as User A, interacts with mobile device 205, shown as Mobile Device A, to request a service. As further shown, assume that the request is an HTTP request, and includes a URL with a network address of "8.27.149.254" and a port number of "80." Further, assume that the date of the request is "1/1/2015." As further shown, assume that service enforcement device 230 receives the request and the URL with the network address. As shown by reference number 820, assume that service enforcement device 230 compares the received network address to a list of stored network addresses, and determines that the received network address matches a stored network address. However, as shown by reference number 830, assume that service enforcement device 230 determines that the date of the request is not within a time period for the toll-free data service campaign associated with the network address.

As shown in FIG. 8B, and by reference number 840, assume that campaign enforcement device 230 provides a notification, to mobile device 205, that the campaign has expired. As shown by reference number 850, assume that mobile device 205 provides the notification for display, shown as "Sorry, this toll-free data service campaign has expired." Further, assume that campaign enforcement device 230 prevents a traffic flow, associated with the requested service, from being established. In this way, User A may be provided with a reason why the toll-free data service could not be provided.

As indicated above, FIGS. 8A and 8B are provided merely as an example. Other examples are possible and may differ from what was described with regard to FIGS. 8A and 8B.

Figure 9A:
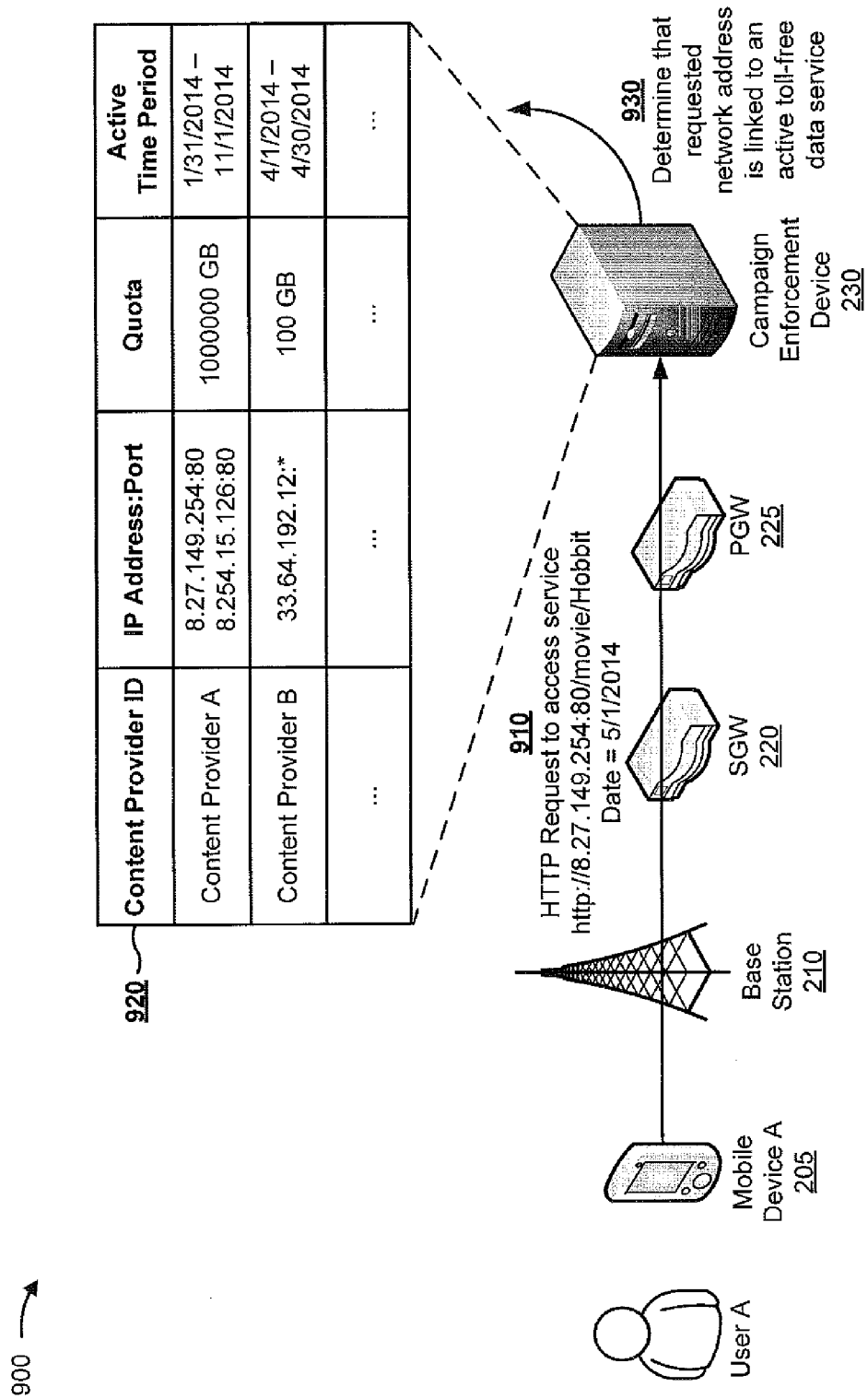
FIGS. 9A and 9B are diagrams of another example implementation relating to the example process shown in FIG. 6.
Figure 9B:
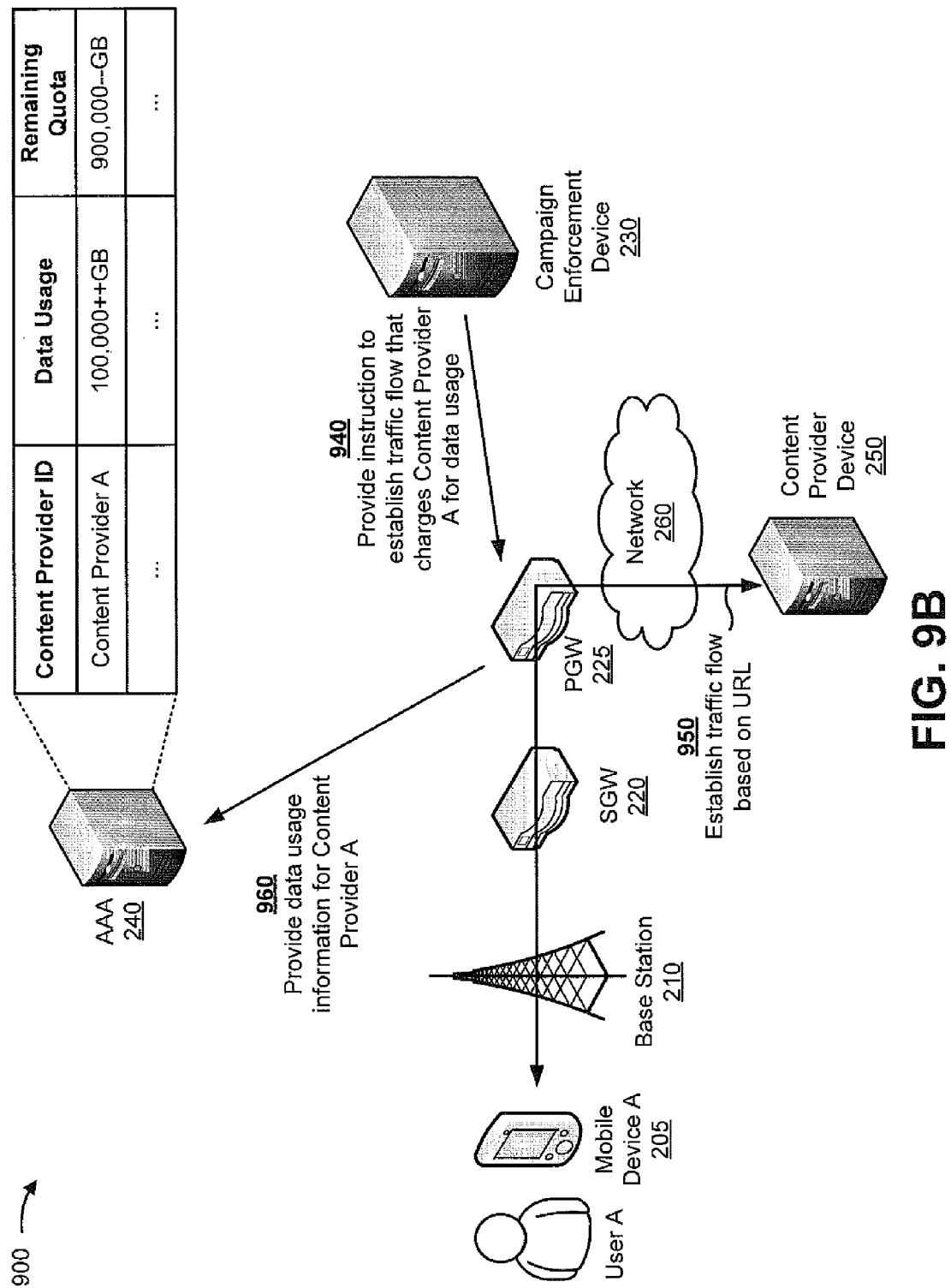

FIGS. 9A and 9B are diagrams of another example implementation 900 relating to example process 600 shown in FIG. 6. FIGS. 9A and 9B show another example of implementing a deployed toll-free data service campaign. For the purpose of FIGS. 9A and 9B, assume that the operations described herein with respect to FIGS. 5A-5C have been performed.

As shown in FIG. 9A, and by reference number 910, assume that a user, shown as User A, interacts with mobile device 205, shown as Mobile Device A, to request a service. As further shown, assume that the request is an HTTP request, and includes a URL with a network address of "8.27.149.254" and a port number of "80." Further, assume that the date of the request is "5/1/2014." As further shown, assume that service enforcement device 230 receives the request and the URL with the network address. As shown by reference number 920, assume that service enforcement device 230 compares the received network address to a list of stored network addresses, and determines that the received network address matches a stored network address. Further, assume that service enforcement device 230 determines that all campaign conditions, associated with the toll-free data service, are satisfied. For example, assume that campaign enforcement device 230 determines that the date of the request is within the time period for the campaign. Thus, as shown by reference number 930, assume that service enforcement device 230 determines that the requested network address is linked to an active toll-free data service.

As shown in FIG. 9B, and by reference number 940, assume that service enforcement device 230 provides an instruction, to PGW 225, to establish a traffic flow that charges Content Provider A (e.g., which provides the toll-free data service) for data usage. As shown by reference number 950, assume that PGW 225 assists in establishing the traffic flow between mobile device 205 (e.g., Mobile Device A) and content provider device 250 (e.g., identified in the request). As shown by reference number 960, assume that PGW 225 provides data usage information, for the traffic flow between Mobile Device A and content provider device 250, to AAA 240. Based on the received data usage information, assume that AAA 240 updates accounting information for Content Provider A, which indicates a quantity of bytes used by Mobile Device A in association with the established traffic flow. In this way, AAA 240 may charge a content provider for data usage when mobile device 205 requests a toll-free data service.

As indicated above, FIGS. 9A and 9B are provided merely as an example. Other examples are possible and may differ from what was described with regard to FIGS. 9A and 9B.

Implementations described herein describe architectures and operations for increasing a speed of traffic processing for toll-free data services by reducing a quantity of domain name server translations required to process the traffic.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   a communication interface; and
   one or more processors, communicatively coupled to the communication interface, to:
      receive campaign information for deploying a toll-free data service campaign,
         the campaign information identifying a uniform resource identifier for accessing a toll-free data service associated with the toll-free data service campaign;
      determine a host name included in the uniform resource identifier;
      determine a network address associated with the host name;
      modify the uniform resource identifier, to generate a modified uniform resource identifier for accessing the toll-free data service, by replacing the host name, included in the uniform resource identifier, with the network address; and
      deploy the toll-free data service campaign by providing, to one or more enforcement devices, the modified uniform resource identifier.

2. The device of claim 1, where the one or more processors, when determining the network address, are to:
   provide the host name to a domain name server; and
   receive the network address from the domain name server based on providing the host name to the domain name server.

3. The device of claim 1,
   where the one or more processors, when determining the network address, are to:
      provide information identifying the host name to another device; and
      receive, from the other device, an internet protocol address associated with the host name, and
   where the one or more processors, when modifying the uniform resource identifier, are to:
      replace the host name, included in the uniform resource identifier, with the internet protocol address to generate the modified uniform resource identifier.

4. The device of claim 1,
   where the network address is a first network address associated with the host name,
   where the one or more processors are further to:
      determine a second network address associated with the host name;
   where the one or more processors, when modifying the uniform resource identifier, are to:
      generate a first modified uniform resource identifier by replacing the host name with the first network address,
         the modified uniform resource identifier being the first modified uniform resource identifier,
   where the one or more processors are further to:
      generate a second modified uniform resource identifier by replacing the host name with the second network address, and
   where the one or more processors, when deploying the toll-free data service campaign, are to:
      provide the first modified uniform resource identifier to the one or more enforcement devices; and
      provide the second modified uniform resource identifier to the one or more enforcement devices.

5. The device of claim 1,
   where the campaign information identifies a geographic region in which the toll-free data service campaign is to be deployed, and
   where the one or more processors, when deploying the toll-free data service campaign, are to:
      deploy the toll-free data service campaign by providing, to the one or more enforcement devices associated with the geographic region, the modified uniform resource identifier.

6. The device of claim 1, where the one or more processors, when deploying the toll-free data service campaign, are to:
   provide a first instruction to the one or more enforcement devices to compare a requested uniform resource identifier, received in a service request from a mobile device, to the modified uniform resource identifier to determine whether the service request is associated with the toll-free data service;
   provide a second instruction to the one or more enforcement devices to charge the mobile device for data used in association with the service request when the service request is associated with the toll-free data service; and
   provide a third instruction to the one or more enforcement devices to charge a content provider, associated with the toll-free data service campaign, for data used in association with the service request when the service request is not associated with the toll-free data service.

7. The device of claim 1, where the network address includes an internet protocol address.

8. A computer-readable medium storing instructions, the instructions comprising:
   one or more instructions that, when executed by one or more processors, cause the one or more processors to:
      receive campaign information for deploying a toll-free data service campaign, the campaign information identifying a uniform resource identifier for accessing a toll-free data service associated with the toll-free data service campaign, and the uniform resource identifier including a host name;

identify the host name included in the uniform resource identifier;

determine a network address associated with the host name;

generate a modified uniform resource identifier, for accessing the toll-free data service, by replacing the host name with the network address; and deploy the toll-free data service campaign by providing, to an enforcement device, information that identifies the modified uniform resource identifier, deploying the toll-free data service campaign permitting the enforcement device to compare a received uniform resource identifier, received from a mobile device, to the modified uniform resource identifier to determine whether the mobile device is requesting access to the toll-free data service.

9. The computer-readable medium of claim 8, where the one or more instructions, that cause the one or more processors to determine the network address, cause the one or more processors to:

provide the host name to a domain name server; and
receive the network address from the domain name server based on providing the host name to the domain name server.

10. The computer-readable medium of claim 8, where the network address includes an internet protocol address.

11. The computer-readable medium of claim 8,
where the one or more instructions, that cause the one or more processors to determine the network address, cause the one or more processors to:

determine a plurality of network addresses associated with the host name,
the plurality of network addresses including the network address, where the one or more instructions, that cause the one or more processors to generate the modified uniform resource identifier, cause the one or more processors to:
generate a plurality of modified uniform resource identifiers corresponding to the plurality of network addresses,
the plurality of modified uniform resource identifiers including the modified uniform resource identifier, and where the one or more instructions, that cause the one or more processors to deploy the toll-free data service campaign, cause the one or more processors to:
provide information that identifies the plurality of modified uniform resource identifiers to the enforcement device,
providing the information that identifies the plurality of modified uniform resource identifiers permitting the enforcement device to compare a received uniform resource identifier, received from a particular mobile device, to the plurality of modified uniform resource identifiers to determine whether the particular mobile device is requesting access to the toll-free data service.

12. The computer-readable medium of claim 11, where the one or more instructions, that cause the one or more processors to generate the plurality of modified uniform resource identifiers, cause the one or more processors to:

generate a first modified uniform resource identifier, of the plurality of modified uniform resource identifiers, by replacing the host name with a first network address of the plurality of network addresses; and generate a second modified uniform resource identifier, of the plurality of modified uniform resource identifiers, by replacing the host name with a second network address of the plurality of network addresses.

13. The computer-readable medium of claim 8,
where the one or more instructions, when executed by the one or more processors, further cause the one or more processors to:

generate one or more campaign rules based on the campaign information,
the one or more campaign rules identifying one or more conditions for charging a content provider, associated with the toll-free data service campaign, for data used by the mobile device in association with the toll-free data service campaign, and where the one or more instructions, that cause the one or more processors to deploy the toll-free data service campaign, cause the one or more processors to:
provide the one or more campaign rules to the enforcement device.

14. The computer-readable medium of claim 8, where the one or more instructions, that cause the one or more processors to deploy the toll-free data service campaign, cause the one or more processors to:

provide, to the enforcement device, an indication that the modified uniform resource identifier is associated with the toll-free data service; and provide, to the enforcement device, information that identifies a content provider to be charged for data usage by the mobile device when the mobile device requests the toll-free data service via the modified uniform resource identifier.

15. A method, comprising:
receiving, by a control device, campaign information for deploying a toll-free data service campaign,
the campaign information identifying a uniform resource identifier for accessing a toll-free data service associated with the toll-free data service campaign, and
the uniform resource identifier including a host name;
identifying, by the control device, the host name included in the uniform resource identifier;
determining, by the control device, a network address associated with the host name,
the network address being different from the host name;
generating, by the control device, a modified uniform resource identifier, for accessing the toll-free data service, by replacing the host name, included in the uniform resource identifier, with the network address;
providing, by the control device and to an enforcement device, the modified uniform resource identifier; and
instructing, by the control device, the enforcement device to use the modified uniform resource identifier to selectively permit a mobile device to access the toll-free data service.

16. The method of claim 15, where determining the network address further comprises:
providing, to another device, information that identifies the host name; and receiving, from the other device, information that identifies the network address.

17. The method of claim 15,
where the network address is an internet protocol address associated with a device that provides the toll-free data service, and
where generating the modified uniform resource identifier comprises:
  replacing the host name, included in the uniform resource identifier, with the internet protocol address.

18. The method of claim 15,
where determining the network address further comprises:
  determining a plurality of internet protocol addresses associated with the host name,
    the plurality of internet protocol addresses including the network address,
where generating the modified uniform resource identifier comprises:
  generating a plurality of modified uniform resource identifiers corresponding to the plurality of internet protocol addresses,
    the plurality of modified uniform resource identifiers including the modified uniform resource identifier,
where providing the modified uniform resource identifier comprises:
  providing the plurality of modified uniform resource identifiers, and
where instructing the enforcement device comprises:
  instructing the enforcement device to use the plurality of modified uniform resource identifiers to selectively permit the mobile device to access the toll-free data service.

19. The method of claim 15, where instructing the enforcement device to use the modified resource identifier to selectively permit the mobile device to access the toll-free data service comprises:
  instructing the enforcement device to permit the mobile device to access the toll-free data service when a requested uniform resource identifier, received from the mobile device, matches the modified uniform resource identifier; and
  instructing the enforcement device to deny the mobile device access to the toll-free data service when the requested uniform resource identifier does not match the modified uniform resource identifier.

20. The method of claim 15, further comprising:
generating a campaign rule based on the campaign information,
  the campaign rule identifying a condition for charging a service provider, associated with the toll-free data service campaign, for data used by the mobile device in association with the toll-free data service campaign;
providing information that identifies the campaign rule to the enforcement device; and
instructing the enforcement device to use the campaign rule to selectively permit the mobile device to access the toll-free data service.

* * * * *